United States Patent
Sander

(10) Patent No.: US 9,699,763 B2
(45) Date of Patent: *Jul. 4, 2017

(54) NETWORK NODE, METHOD, AND MOBILE TERMINAL FOR PROVIDING VOICE CALLS TO A MOBILE TERMINAL IN A PACKET-SWITCHED-ONLY NETWORK

(71) Applicant: TELEFONAKTIEBOLAGET LM ERICSSON (PUBL), Stockholm (SE)

(72) Inventor: Ann-Christine Sander, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,076

(22) Filed: Jan. 17, 2017

(65) Prior Publication Data
US 2017/0127380 A1    May 4, 2017

Related U.S. Application Data

(63) Continuation of application No. 14/876,838, filed on Oct. 7, 2015, now Pat. No. 9,596,713, which is a (Continued)

(51) Int. Cl.
*H04W 68/00*    (2009.01)
*H04W 8/06*    (2009.01)
*H04M 7/00*    (2006.01)

(52) U.S. Cl.
CPC ....... *H04W 68/005* (2013.01); *H04M 7/0024* (2013.01); *H04W 8/06* (2013.01); *H04M 2207/187* (2013.01)

(58) Field of Classification Search
CPC ..... H04W 68/005; H04W 8/06; H04W 76/04; H04M 7/0024; H04M 2207/187; H04M 7/006
See application file for complete search history.

(56) References Cited

U.S. PATENT DOCUMENTS 6,930,730 B2 *  8/2005  Maxon ................ H04L 12/2805
                                                      340/12.53
7,039,858 B2 *  5/2006  Humpleman ....... H04L 12/2805
                                                      348/E5.006
(Continued)

FOREIGN PATENT DOCUMENTS

GB    2402846 A    12/2004
WO    32093811 A3    11/2002

OTHER PUBLICATIONS

3GPP TS 23.060, V6.8.0 3rd Generation Partnership Project; Technical Specification Group Services and System Aspects; General Packet Radio Service (GPRS); Service Description; Stage 2 (Release 6), Mar. 2005.
(Continued)

*Primary Examiner* — Khaled Kassim

(57) ABSTRACT

A network node, method, and mobile terminal for providing circuit-switched (CS) voice calls to a mobile terminal operating in a packet-switched (PS)-only network. A control node such as an EPC node in an SAE/LTE PS-only network is modified to mimic the messaging functionality of a Serving GPRS Service Node (SGSN). The EPC node is connected to an MSC/VLR in a CS network through a Gs interface. The EPC node registers the terminal with the MSC/VLR and provides a VLR TMSI to the terminal. When the MSC/VLR receives an incoming CS voice call for the terminal, the MSC/VLR notifies the EPC node, which sends a paging message to the terminal. To set up the CS voice call, the terminal sends a paging response directly to the MSC/VLR.

3 Claims, 6 Drawing Sheets

Related U.S. Application Data continuation of application No. 14/671,122, filed on Mar. 27, 2015, now Pat. No. 9,191,984, which is a continuation of application No. 11/428,103, filed on Jun. 30, 2006, now Pat. No. 9,019,953.

(56) References Cited

U.S. PATENT DOCUMENTS

| | | | |
|---|---|---|---|
| 7,526,320 B2 * | 4/2009 | Semper | H04W 68/00 455/560 |
| 2002/0061756 A1 * | 5/2002 | Bleckert | H04W 68/12 455/458 |
| 2002/0122401 A1 * | 9/2002 | Xiang | H04W 76/026 370/338 |
| 2003/0143996 A1 | 7/2003 | Peglion | |
| 2003/0152048 A1 | 8/2003 | Soininen | |
| 2003/0169725 A1 | 9/2003 | Ahmavaara | |
| 2004/0058688 A1 * | 3/2004 | Silver | H04W 8/08 455/456.1 |
| 2004/0150546 A1 * | 8/2004 | Choi | H04B 1/202 341/176 |
| 2004/0235473 A1 * | 11/2004 | Sanchez | H04L 29/12066 455/435.2 |
| 2006/0062207 A1 | 3/2006 | Julka | |
| 2006/0291455 A1 * | 12/2006 | Katz | H04L 29/06 370/355 |
| 2007/0091877 A1 | 4/2007 | Lundin | |
| 2007/0121012 A1 * | 5/2007 | Hida | G06F 3/1431 348/589 |
| 2007/0211693 A1 | 9/2007 | Hirsimaki | |
| 2007/0238466 A1 | 10/2007 | Buckley | |
| 2007/0238467 A1 | 10/2007 | Buckley | |
| 2008/0055452 A1 * | 3/2008 | Carlson | H04N 7/18 348/333.01 |
| 2008/0316998 A1 | 12/2008 | Procopio | |
| 2010/0255808 A1 * | 10/2010 | Guo | H04W 4/22 455/404.1 |

OTHER PUBLICATIONS

3GPP TS 29.016 V6.0.0 3rd Generation Partnership Project; Technical Specification Group Core Network; Generatl Packet Radio Service (GPRS); Serving GPRS Support Node (SGSN)—Visitors Location Register (VLR); Gs interface network service specification (Release 6), Dec. 2004.

3GPP TS 29.018 V7.2.0 3rd Generation Partnership Project; Technical Specification Group Core Network and Terminals; General Packet Radio Service (GPRS); Serving GPRS Support Node (SGSN)—Visitors Location Register (VLR); Gs interface layer 3 specification (Release 7), Mar. 2006.

3GPP TR 23.806 V7.0.0 3rd Generation Partnership Project; Technical Specification Group Services and System Aspects; Voice Call Continuity between CS and IMS Study (Release 7), Dec. 2005.

Vodafone, Signalling free inter-RAT mobility and the CS domain, 3GPP TSG SA WG2 Architecture—S2#51, S2-060795, Denver, Colorado, USA, Feb. 13-17, 2006.

* cited by examiner

NETWORK NODE, METHOD, AND MOBILE TERMINAL FOR PROVIDING VOICE CALLS TO A MOBILE TERMINAL IN A PACKET-SWITCHED-ONLY NETWORK

CROSS-REFERENCE TO RELATED APPLICATIONS

This application is a continuation of co-pending U.S. patent application Ser. No. 14/876,838 filed on Oct. 7, 2015, which is a continuation of U.S. patent application Ser. No. 14/671,122 filed on Mar. 27, 2015, now U.S. Pat. No. 9,191,984, which is a continuation of U.S. patent application Ser. No. 11/428,103 filed on Jun. 30, 2006, now U.S. Pat. No. 9,019,953, the disclosures of which are fully incorporated herein by reference.

STATEMENT REGARDING FEDERALLY SPONSORED RESEARCH OR DEVELOPMENT: NOT APPLICABLE

REFERENCE TO SEQUENCE LISTING, A TABLE, OR A COMPUTER PROGRAM LISTING COMPACT DISC APPENDIX: NOT APPLICABLE

BACKGROUND OF THE INVENTION

This invention relates to communication systems. More particularly, and not by way of limitation, the invention is directed to a network node, method, and mobile terminal for providing voice calls to a mobile terminal operating in a packet-switched-only network.

Wireless networks today, such as second-generation (2G) GSM networks, third-generation (3G) networks, and Wireless Local Area Networks (WLANs) support Packet-Switched (PS) services and/or Circuit-Switched (CS) services. A user in a 2G or 3G network may use either CS services such as speech, or PS services such as Internet Access. The availability of CS and PS services also depends on the terminal. Some devices such as Laptop PC-cards are PS-only devices, while other devices such as older GSM phones without GPRS support are CS-only devices. A user in a PS-only network may use only PS services, although Voice-over-IP (VoIP) is emerging. New wireless networks such as Wimax support only PS and not CS. New standards for PS-only networks are also being investigated by the Third Generation Partnership Project (3GPP) in a feasibility study for System Architecture Evolution/Long Term Evolution (SAE/LTE). The SAE portion of this study is focused on a new core network, while the LTE portion of the study is focused on a new radio network.

General information regarding 2G and 3G networks may be found in the technical specification 3GPP TS 23.060, v.6.13.0. Further information about the Gs interface may be found in the technical specification 3GPP TS 29.018, v. 6.4.0. Further information about SAE/LTE networks may be found in the technical specification 3GPP TS 23.882, v. 1.2.3. Each of these technical specifications is hereby incorporated herein by reference.

Many users, however, prefer CS voice service because the quality of CS voice service is in many cases superior to PS voice quality. Operators may also prefer CS voice services because operators must heavily invest to provide VoIP services.

Some existing networks contain both a CS part and a PS part of the network. An interface known as the Gs interface provides co-ordination between a Mobile Switching Center/Visitor Location Register (MSC/VLR), which handles CS traffic in the CS part of the network, and a Serving GPRS Service Node (SGSN), which handles PS traffic in the PS part of the network. The Gs interface is used by the MSC/VLR for paging the mobile terminal for CS services, for exchanging location information between the CS part and the PS part, and for conveying some CS-related procedures through the SGSN. The Gs interface makes it possible for a mobile terminal supporting both CS and PS services to connect to both services via the PS domain. The Gs interface enables a mobile terminal using a combined CS and PS network to send some messages only to the PS part to save radio transmissions. The PS part then informs the CS part of needed information through signaling to ensure that both the CS and PS parts of the network have the same information about the mobile terminal.

When a mobile terminal is operating in a PS-only network, there are several reasons why the mobile terminal cannot receive CS voice calls. First, there is no mechanism for registering the mobile terminal with an MSC. Second, even if the mobile terminal was registered with an MSC/VLR, there is no signaling mechanism for forwarding paging messages from the MSC/VLR to the mobile terminal. Thus, the mobile terminal cannot be alerted when a CS voice call is incoming. Additionally, the mobile terminal itself lacks the functionality for using more than one radio technology at the same time. Although some high-end mobile terminals are capable of supporting more than one network technology, they cannot use more than one radio technology at the same time because battery consumption or interference issues make it technically impossible. Low-end terminals, where cost is an important issue, are often not designed with this capability due to cost constraints. Thus, the terminal is restricted to using either PS-only data services or CS-only voice services, but not both at the same time. Therefore, if the mobile user is using a PS-only data service, the user cannot receive any CS voice calls.

It should also be noted that networks providing both CS and PS services (such as GSM or WCDMA), generally have better coverage than PS-only networks (such as WLAN). However, PS-only networks generally offer higher bandwidths, perhaps even 100 times higher, than networks providing both CS and PS services. This higher bandwidth can be very useful for applications such as IPTV, video, downloading from the Internet, and the like. When a mobile terminal is using a PS service in a PS-only network, it is technically feasible to maintain the PS service when moving to a combined CS/PS network, if the two networks are operated by the same operator, and if the operator has chosen to implement the network in this way. In the combined CS/PS network, the same radio access technology is utilized for both CS and PS services, and the mobile terminal can receive CS voice calls while running the PS service. However, in most cases, some PS bandwidth capability will be lost. From the bandwidth perspective, it would be beneficial for the terminal to continue to use the PS-only network, but the drawback is that any incoming CS calls to the mobile terminal are lost.

What is needed in the art is a network node, method, and mobile terminal for providing voice calls to a mobile terminal that overcomes the disadvantages of the prior art. The present invention provides such a network node, method, and mobile terminal.

BRIEF SUMMARY OF THE INVENTION

The present invention is a network node, method, and mobile terminal for providing voice calls to a mobile terminal operating in a packet-switched-only network. From the user's perspective, the invention provides the advantage that it enables a mobile terminal to receive CS voice calls when using a PS-only network. From the network operator's perspective, the invention enables the network operator to provide CS voice calls when the mobile users are using PS-only networks. The operator can therefore provide PS-only network services without having to fully implement VoIP services.

In one aspect, the present invention is directed to a method of providing a circuit-switched voice call to a mobile terminal operating in a packet-switched-only network. The method includes mimicking, in a control node in the packet-switched-only network, the messaging functionality of a Serving GPRS Service Node (SGSN); connecting the control node to a mobile switching center/visitor location register (MSC/VLR) in a circuit-switched network through a Gs interface; and forwarding by the control node, a paging message received from the MSC/VLR. The paging message is forwarded to the mobile terminal for direct response to the MSC/VLR.

In another aspect, the present invention is directed to a control node in a packet-switched-only network. The control node includes a packet-switched-only communication unit for wirelessly communicating with a mobile terminal; a SGSN mimic unit for mimicking the messaging functionality of an SGSN; and a Gs interface connection from the SGSN mimic unit to an MSC/VLR in a circuit-switched network.

In another aspect, the present invention is directed to a mobile terminal for receiving a CS voice call while operating in a PS-only network. The mobile terminal includes a packet-switched communication protocol stack for sending and receiving messages with a control node in the PS-only network; a circuit-switched communication protocol stack for sending and receiving messages with an MSC/VLR in a CS network; and a controller for determining when to use the packet-switched communication protocol stack and when to use the circuit-switched communication protocol stack.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

The present invention enables a mobile terminal to receive CS voice calls when operating in a PS-only network. This feature is enabled by adding to one or several nodes in the PS-only network, the functionality to act as an SGSN towards a combined CS/PS network with both CS and PS functionality, such as 2G or 3G networks. One or several nodes in the PS-only network then function as an SGSN proxy towards the combined CS/PS network, while requiring minimal or no changes in the combined CS/PS network.

Figure 1:
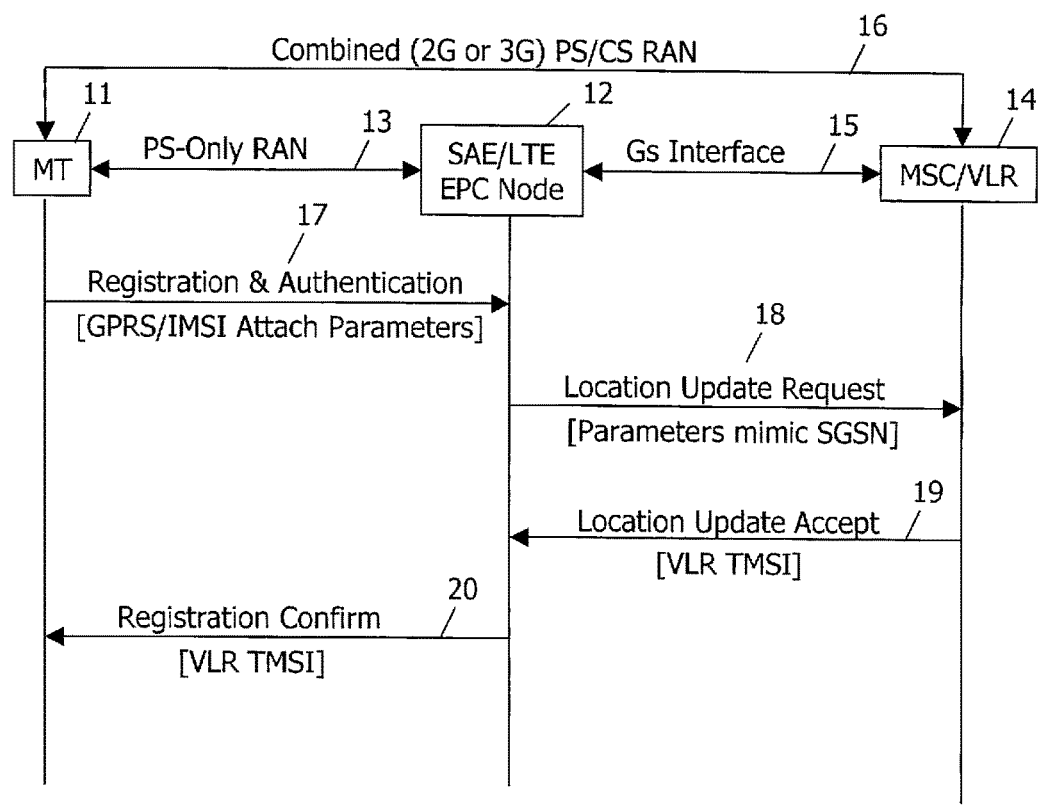
FIG. 1 is a signaling diagram illustrating the flow of messages between various network entities when a mobile terminal registers with a PS-only network in an exemplary embodiment of the system and method of the present invention.

FIG. 1 is a signaling diagram illustrating the flow of messages between various network entities when a mobile terminal (MT) 11 registers with a PS-only network in an exemplary embodiment of the system and method of the present invention. It is assumed that the MT is capable of utilizing a combined PS/CS network (such as a 3G network), and is also capable of utilizing a different PS-only network (such as, for example, an SAE/LTE network). However, the MT is not able to use both networks at the same time. The MT communicates with an SAE/LTE Evolved Packet Core (EPC) node 12 over a PS-only Evolved Radio Access Network (RAN) 13. The term EPC denotes the Core Network and the included nodes needed for SAE. The EPC node, in turn, communicates with a Mobile Switching Center/Visitor Location Center (MSC/VLR) 14 in the combined PS/CS network over the Gs Interface 15. To communicate directly with the MSC/VLR, the MT utilizes a combined (2G or 3G) RAN 16.

At step 17, the MT 11 sends a registration message including authentication information to the EPC node 12. The MT may also include certain parameters, which enable the EPC node to mimic an SGSN. In a typical 2G/3G network registration, the MT would register with an SGSN by sending a combined GPRS and IMSI Attach message to the SGSN. Therefore, to enable the EPC node to mimic or emulate an SGSN, the MT may send the same parameters normally included in the GPRS and IMSI Attach message.

At step 18, the EPC node 12 utilizes the Gs Interface 15 to send a Location Update Request message to the MSC/VLR 14. Included in the message are parameters enabling the EPC node to mimic or emulate an SGSN. At step 19, the MSC/VLR sends a Location Update Accept message to the EPC node. This message acknowledges the Location Update Request and includes a temporary identifier (e.g., VLR TMSI) for the MT. At step 20, the EPC node sends a Registration Confirm message to the MT. This message acknowledges the Registration message 17 and includes several parameters including the VLR TMSI received from the MSC/VLR. The MT stores the VLR TMSI, which is needed for communications with the MSC/VLR.

Figure 2:
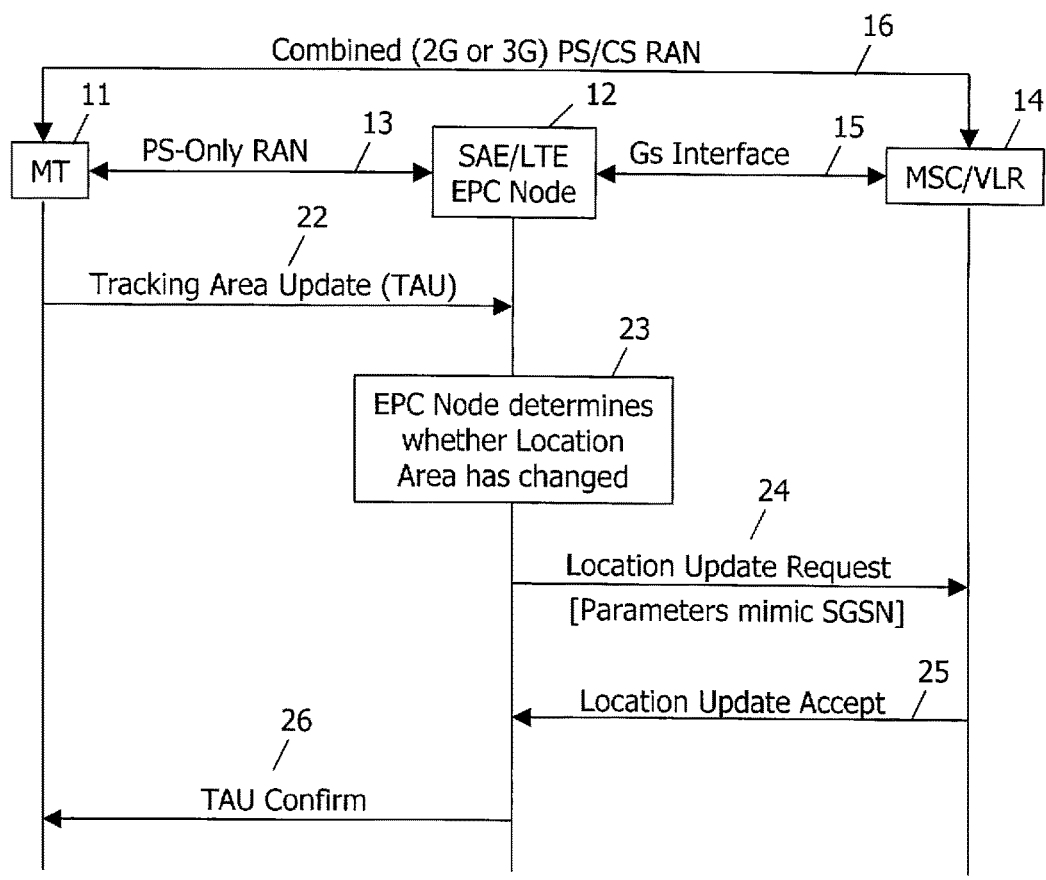
FIG. 2 is a signaling diagram illustrating the flow of messages between various network entities when a mobile terminal performs a Tracking Area Update with a PS-only network in an exemplary embodiment of the system and method of the present invention.

FIG. 2 is a signaling diagram illustrating the flow of messages between various network entities when a mobile terminal performs a Tracking Area Update with a PS-only network in an exemplary embodiment of the system and method of the present invention. If the MT 11 changes Tracking Areas in the PS-only network, the MT reports this fact in a Tracking Area Update (TAU) message 22, which is sent to the EPC node 12. The change of Tracking Areas may or may not equate to a change of Location Areas in the 2G or 3G network. In 2G networks such as GSM, MTs are tracked in Location Areas (LAs) and Routing Areas (RAs). In UMTS (3G) networks, MTs may be tracked in UTRAN Registration Areas (URAs) as well as LAs and RAs. The term "Tracking Area" is used as a generic name for URAs, LAs, and RAs. The EPC node is programmed with information for translating Tracking Areas into the equivalent Location Areas (for example, a TA/LA lookup table), and at step 23, the EPC node determines whether the Location Area has also changed. If the Location Area has changed, the MSC/CLR 14 must be informed. Therefore, at step 24, the EPC node utilizes the Gs Interface 15 to send a Location Update Request message to the MSC/VLR. Included in this message are the parameters necessary to mimic an SGSN. At step 25, the MSC/VLR sends a Location Update Accept message back to the EPC node. At step 26, the EPC node sends a TAU Confirm message back to the MT. Note that this message is sent to acknowledge the TAU message 22 regardless of whether the Location Area was changed.

Figure 3:
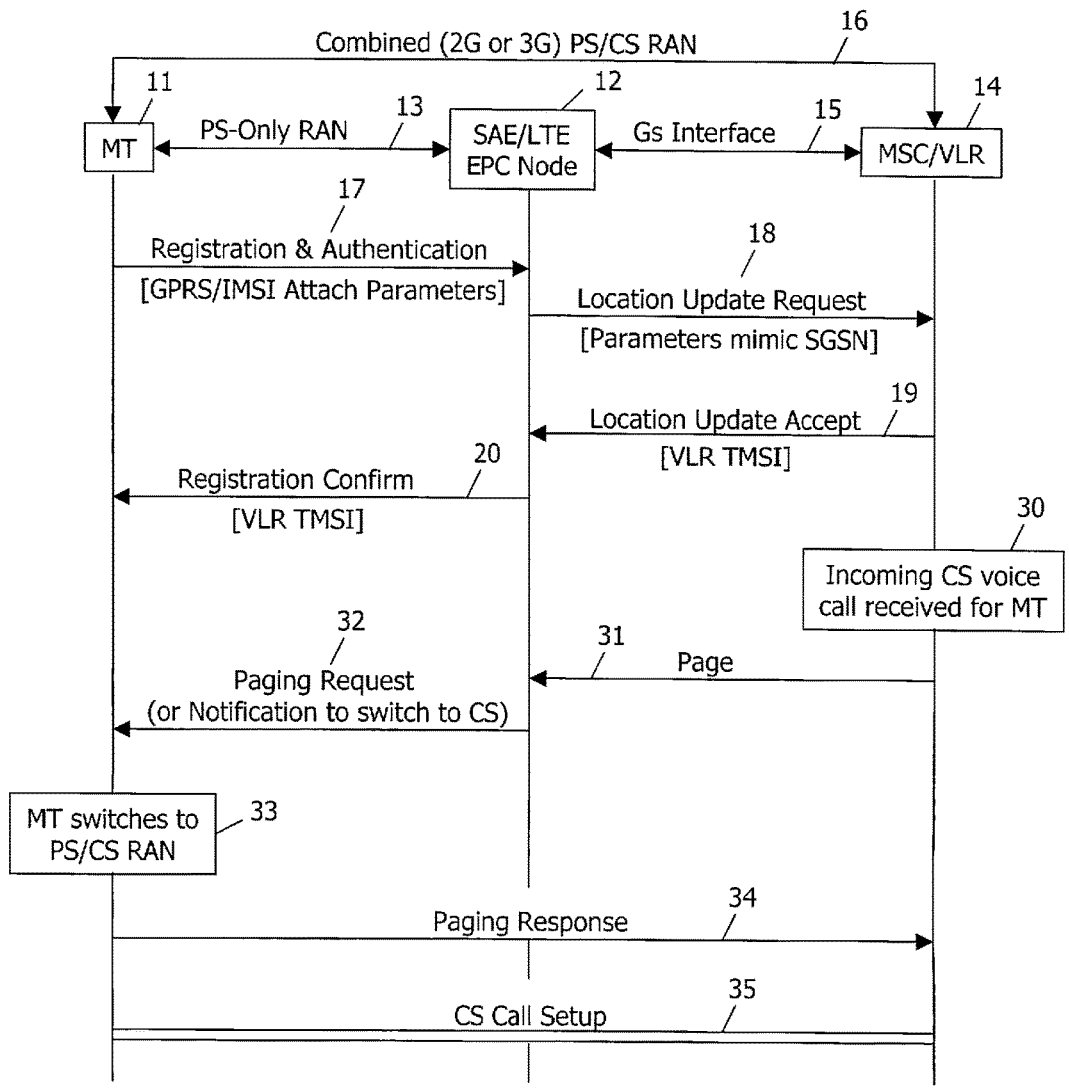
FIG. 3 is a signaling diagram illustrating the flow of messages between various network entities when a mobile terminal receives a CS voice call while operating in a PS-only network in an exemplary embodiment of the system and method of the present invention.

FIG. 3 is a signaling diagram illustrating the flow of messages between various network entities when a mobile terminal receives a CS voice call while operating in a PS-only network in an exemplary embodiment of the system and method of the present invention. Steps 17 through 20 illustrate the registration process as described above in connection with FIG. 1. At step 30, the MSC/VLR 14 receives an incoming CS call for the MT 11. At step 31, the MSC/VLR utilizes the Gs interface 15 to send a Page message to the EPC node 12 identifying the MT. At step 32, the EPC node sends the equivalent of a Paging Request message to the MT. Alternatively, this message may be an end-user message notifying the end user to manually initiate the change of radio network usage from the PS-only SAE/LTE network to the 2G/3G network. At step 33, the MT performs the procedures to switch from the PS-only SAE/LTE network to the 2G/3G network. At step 34, the MT sends a Paging Response message directly to the MSC/VLR. Thereafter, at step 35, normal CS call setup procedures are performed between the MT and the MSC/VLR to accept and receive the incoming CS call.

It should be understood that the Paging Request message, which the MT recognizes as a CS-related message, is different from the PS-related message that the EPC node uses to invite the MT to participate in a PS data session. The MT recognizes the difference and sends the response to either the MSC/VLR or the EPC node accordingly.

Figure 4:
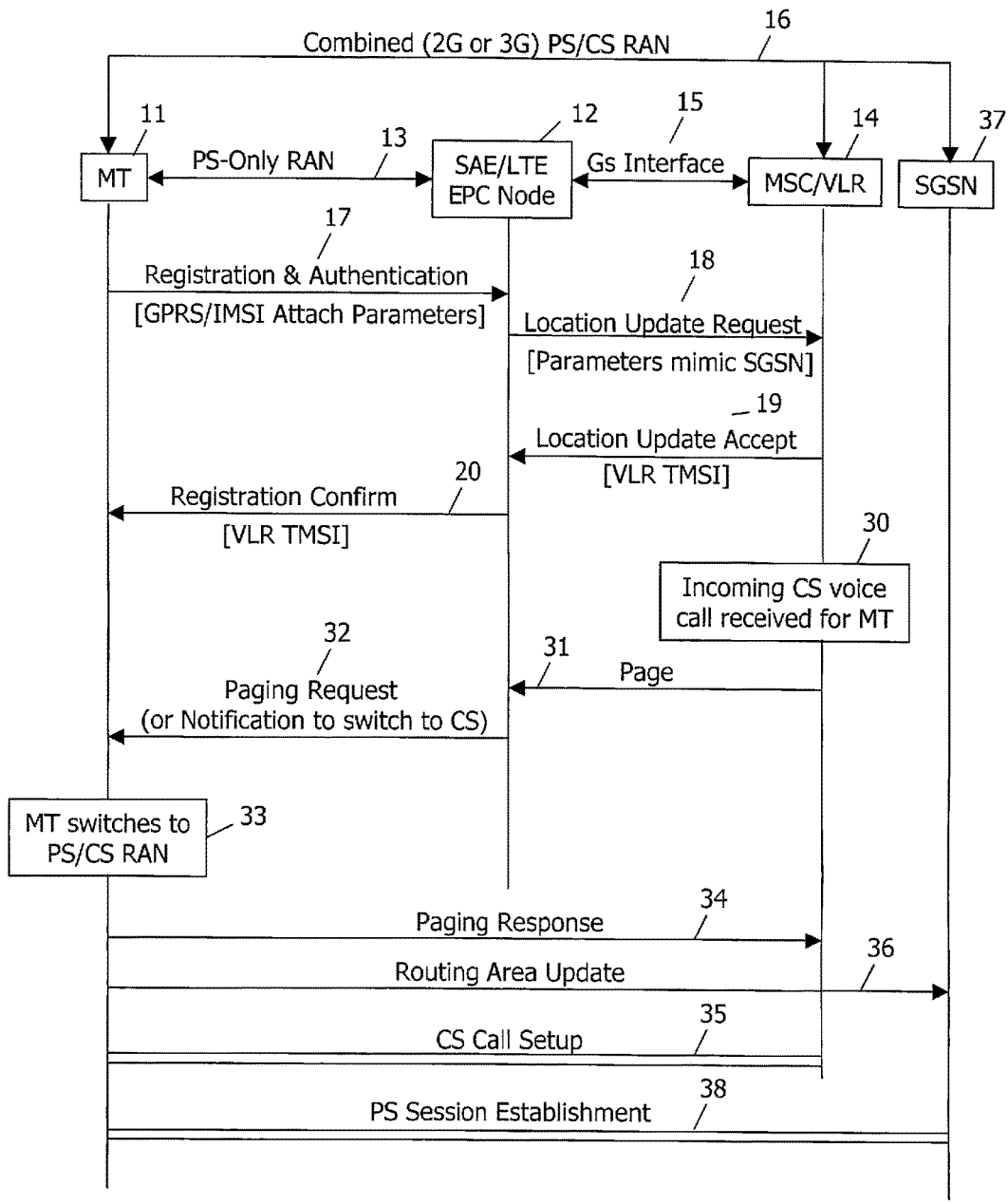
FIG. 4 is a signaling diagram illustrating the flow of messages between various network entities when a mobile terminal receives a CS voice call while actively involved in data transmission in a PS-only network in an exemplary embodiment of the system and method of the present invention.

FIG. 4 is a signaling diagram illustrating the flow of messages between various network entities when a mobile terminal receives a CS voice call while actively involved in data transmission in a PS-only network in an exemplary embodiment of the system and method of the present invention. Steps 17 through 20 illustrate the registration process as described above in connection with FIG. 1. At step 29, a PS session is established between the MT 11 and the EPC node 12. If the MT 11 is actively involved in data transmission in a packet session in the PS-only network at the time the notification of an incoming CS voice call is received at step 30, procedures may be utilized to also move the packet session from the PS-only network to the combined PS/CS network. As a result, the mobile end user is able to continue the packet session in the combined PS/CS network (although with less bandwidth), while also being able to receive the CS call. In one embodiment, when the MT receives the Paging Request message 32, the MT answers by sending both a Page Response message 34 to the MSC/VLR 14, and a Routing Area Update message 36 to its SGSN 37 to announce its presence in the 2G/3G PS network. Thereafter, at step 35, normal CS call setup procedures are performed between the MT and the MSC/VLR to accept and receive the incoming CS call. Likewise, normal PS session establishment procedures 38 are performed between the MT and the SGSN to reestablish the data session in the 2G/3G PS network.

Figure 5:
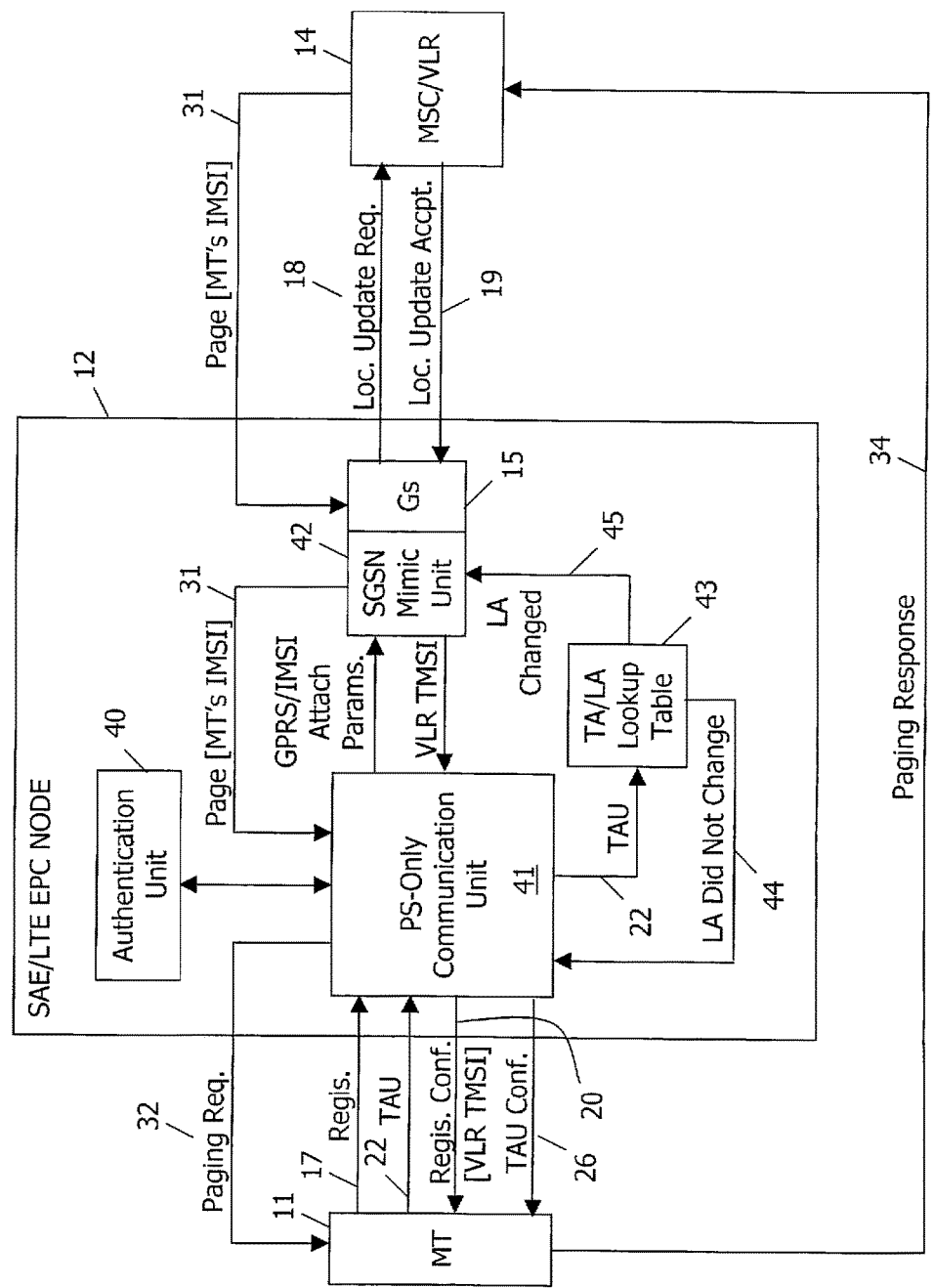
FIG. 5 is a simplified block diagram of an exemplary embodiment of a PS network node as taught by the present invention.

FIG. 5 is a simplified block diagram of an exemplary embodiment of a PS network node as taught by the present invention. In the illustrated embodiment, the network node is an EPC node 12 in an SAE/LTE network. Network nodes in other types of PS-only networks may also be utilized. The EPC node includes a PS-only communication unit 41, which communicates with the MT 11 operating in the PS-only network. The PS-only communication unit receives and sends the various messages 17, 20, 22, and 26 shown and described in FIGS. 1-4. When the PS only communication unit receives the Registration message 17, it authenticates the MT with an Authentication Unit 40. The PS-only communication unit then forwards message parameters to an SGSN mimic unit 42 enabling the SGSN mimic unit to mimic SGSN signaling over the Gs interface 15 to the MSC/VLR 14. In the illustrated example, the forwarded parameters are the parameters from a GPRS/IMSI Attach message. The SGSN mimic unit then sends the Location Update Request message 18 to the MSC/VLR 14. The MSC/VLR returns the Location Update Accept message 19, which as noted earlier, includes the VLR TMSI. The SGSN mimic unit forwards the VLR TMSI to the PS-only communication unit, which sends the VLR TMSI to the MT 11 in the Registration Confirm message 20.

When the EPC node 12 receives a TAU message 22 from the MT 11, the PS-only communication unit 41 forwards the TAU to a TA/LA lookup table 43. The TA/LA lookup table determines whether the change of Tracking Area in the TAU message also resulted in a change of Location Area. If the Location Area did not change, the TA/LA lookup table reports this fact at 44 to the PS-only communication unit 41, which sends the TAU confirm message 26 to the MT. If the change of Tracking Area also resulted in a change of Location Area, the TA/LA lookup table reports this fact at 45 to the SGSN mimic unit 42. The SGSN mimic unit uses the Gs interface 15 to send the Location Update Request message 18 to the MSC/VLR 14. The MSC/VLR returns the Location Update Accept message 19 to the EPC node, and any new VLR TMSI information is reported to the MT in the TAU Confirm message 26.

When the MSC/VLR 14 receives a CS voice call for the MT 11, the MSC/VLR sends the Page message 31 over the Gs interface 15 to the EPC node 12. The Page message includes an identifier for the MT such as the MT's IMSI. The SGSN mimic unit 41 passes the Page to the PS-only communication unit 41, which sends the Paging Request 32 to the MT. The MT then sends the Paging Response directly to the MSC/VLR 14.

Figure 6:
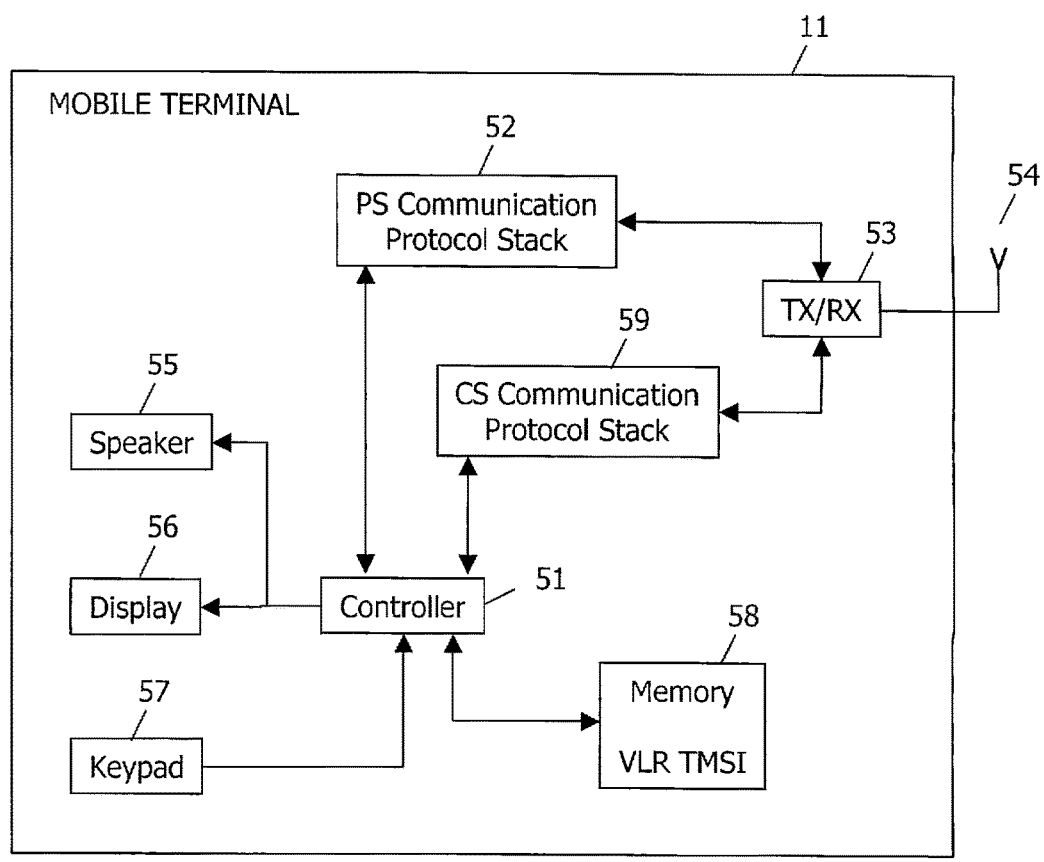
FIG. 6 is a simplified block diagram of an exemplary embodiment of a mobile terminal as taught by the present invention.

FIG. 6 is a simplified block diagram of an exemplary embodiment of a mobile terminal (MT) 11 as taught by the present invention. When the MT is operating in a PS-only network, a controller 51 controls a PS communication protocol stack 52, which sends and receives messages 17, 20, 22, and 26 through a transceiver (TX/RX) 53 and an antenna 54. When there is an incoming CS voice call for the MT, the EPC node 12 may send an end-user message to the MT notifying the end user to manually initiate a change of radio network usage from the PS-only network to a 2G/3G network supporting CS calls. The controller may notify the user through a speaker 55 or a visual display 56. The user may indicate the desire to accept the CS voice call through a keypad 57. The controller then retrieves the VLR TMSI from memory 58 and causes a CS communication protocol stack 59 to construct and send the Paging Response 34 utilizing the transceiver 53 and the antenna 54.

In an alternative embodiment, the MT is capable of automatically switching to the 2G/3G network. When the MT receives the Paging Request 32 indicating that there is an incoming CS voice call for the MT, the controller automatically switches from the PS communication protocol stack 52 to the CS communication protocol stack 58 to construct and send the Paging Response 34 utilizing the transceiver 53 and the antenna 54.

The controller 51 recognizes the Paging Request message as being a CS-related message, and thus uses the CS communication protocol stack 58 to send the Paging Response to the MSC/VLR 14. The controller also recognizes when the EPC node 12 sends a PS-related invitation to participate in a PS data session. In this case, the controller uses the PS communication protocol stack 52 to send a response to the EPC node.

If the MT 11 is actively involved in data transmission in a packet session in the PS-only network at the time the notification of an incoming CS voice call is received, the procedures discussed above in connection with FIG. 4 may be utilized to also move the packet session from the PS-only network to the 2G/3G network. As a result, the mobile end user is able to continue the packet session in the combined PS/CS network (although with less bandwidth), while also being able to receive the CS call. When the MT receives the Paging Request message 32, the controller retrieves the VLR TMSI from memory 58 and causes the CS communication protocol stack 59 to send a Page Response message 34 to the MSC/VLR 14. The controller also sends a Routing Area Update message 36 to the MT's SGSN 37 to announce its presence in the 2G/3G PS network. Thereafter, normal CS call setup procedures are performed between the MT and the MSC/VLR to accept and receive the incoming CS call. Likewise, normal PS session establishment procedures are performed between the MT and the SGSN to reestablish the data session in the 2G/3G PS network.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method in a mobile terminal of receiving a circuit-switched (CS) voice call when the mobile terminal is operating in a packet-switched-only wireless telecommunication network, said method comprising:
    receiving a paging request message from the packet-switched-only network;
    determining whether the paging request message is an invitation to participate in a data session in the packet-switched-only network, or is an invitation to accept an incoming CS voice call through a Mobile Switching Center/Visitor Location Register (MSC/VLR);
    upon determining that the paging request message is an invitation to participate in a data session in the packet-switched-only network, utilizing a packet-switched communication protocol stack in the mobile terminal to transmit a response to a control node in the packet-switched-only network; and
    upon determining that the paging request message is an invitation to accept an incoming CS voice call, utilizing a circuit-switched communication protocol stack in the mobile terminal to transmit a response directly to the MSC/VLR, wherein utilizing a circuit-switched communication protocol stack in the mobile terminal to transmit a response directly to the MSC/VLR includes:
        retrieving from memory, a VLR Temporary Mobile Subscriber Identity (TMSI) identifying the mobile terminal; and
        including the VLR TMSI in a paging response message transmitted directly to the MSC/VLR.

2. A mobile terminal configured to receive a circuit-switched (CS) voice call while operating in a packet-switched-only wireless telecommunication network, said mobile terminal comprising:
    a packet-switched communication protocol stack that sends and receives messages with a control node in the packet-switched-only network;
    a circuit-switched communication protocol stack that sends and receives messages with the MSC/VLR in the CS network; and
    a controller that determines when to use the packet-switched communication protocol stack and when to use the circuit-switched communication protocol stack, wherein:
    the controller determines whether a paging request message received from the packet-switched-only network is an invitation to participate in a data session in the packet-switched-only network, or is an invitation to accept an incoming CS voice call;
    wherein the controller utilizes the packet-switched communication protocol stack to transmit a response to a control node in the packet-switched-only network upon determining that the paging message is an invitation to participate in a data session in the packet-switched-only network; and
    wherein the controller utilizes the circuit-switched communication protocol stack to transmit a response directly to the MSC/VLR upon determining that the paging message is an invitation to accept an incoming CS voice call, wherein the controller is configured to utilize the circuit-switched communication protocol stack in the mobile terminal to transmit a response directly to the MSC/VLR by:
        retrieving from memory, a VLR Temporary Mobile Subscriber Identity (TMSI) identifying the mobile terminal; and
        including the VLR TMSI in a paging response message transmitted directly to the MSC/VLR.

3. A mobile terminal configured to receive a circuit-switched (CS) voice call while operating in a packet-switched-only wireless telecommunication network, said mobile terminal including a radio transceiver, a control processor, and a non-transitory memory containing instructions executable by the control processor, whereby the mobile terminal is operative to:
    receive a paging request message from the packet-switched-only network;
    determine whether the paging request message is an invitation to participate in a data session in the packetswitched-only network, or is an invitation to accept an incoming CS voice call through a Mobile Switching Center (MSC);

upon determining that the paging message is an invitation to participate in a data session in the packet-switched-only network, utilize a packet-switched communication protocol stack in the mobile terminal to transmit a response to a control node in the packet-switched-only network; and upon determining that the paging message is an invitation to accept an incoming CS voice call, utilize a circuit-switched communication protocol stack in the mobile terminal to transmit a response directly to the MSC, wherein the mobile terminal is operable to utilize the circuit-switched communication protocol stack in the mobile terminal to transmit a response directly to the MSC/VLR by:

retrieving from memory, a VLR Temporary Mobile Subscriber Identity (TMSI) identifying the mobile terminal; and including the VLR TMSI in a paging response message transmitted directly to the MSC/VLR.

* * * * *

UNITED STATES PATENT AND TRADEMARK OFFICE
CERTIFICATE OF CORRECTION

| | | |
|---|---|---|
| PATENT NO. | : 9,699,763 B2 | Page 1 of 1 |
| APPLICATION NO. | : 15/408076 | |
| DATED | : July 4, 2017 | |
| INVENTOR(S) | : Sander | |

It is certified that error appears in the above-identified patent and that said Letters Patent is hereby corrected as shown below:

On the Title Page

On Page 2, in Item (56), under "OTHER PUBLICATIONS", in Column 2, Line 2, delete "Generatl" and insert -- General --, therefor.

In the Specification

In Column 1, Line 10, delete "2015," and insert -- 2015, now U.S. Pat. No. 9,596,713, --, therefor.

In Column 3, Line 45, delete "DRAWING" and insert -- DRAWINGS --, therefor.

In Column 4, Line 33, delete "Evolved Radio" and insert -- Radio --, therefor.

In Column 4, Line 37, delete "Center" and insert -- Register --, therefor.

In Column 5, Line 15, delete "MSC/CLR" and insert -- MSC/VLR --, therefor.

In Column 6, Line 55, delete "SGSN mimic unit 41" and insert -- SGSN mimic unit 42 --, therefor.

In Column 7, Line 14, delete "CS communication protocol stack 58" and insert -- CS communication protocol stack 59 --, therefor.

In Column 7, Lines 18-19, delete "CS communication protocol stack 58" and insert -- CS communication protocol stack 59 --, therefor.

In the Claims

In Column 8, Line 4, in Claim 1, delete "network; and" and insert -- network; --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*